Patented May 10, 1949

2,469,431

UNITED STATES PATENT OFFICE 2,469,431

INSOLUBILIZATION OF WATER-SOLUBLE HYDROXYL-CONTAINING POLYMERIC MATERIALS

Aubrey E. Broderick, South Charleston, W. Va., assignor to Carbide and Carbon Chemicals Corporation, a corporation of New York No Drawing. Application September 27, 1945, Serial No. 618,989

8 Claims. (Cl. 260—15)

This invention relates to a method for converting water-soluble or water-dispersible high molecular weight compounds containing a multiplicity of hydroxyl groups into complexes which are insoluble in water. More especially, it concerns the insolubilization of water-soluble polymeric hydroxyl-containing products such as polyvinyl alcohols and the water-soluble cellulose ethers. It has especial utility for the production of films, foils, sheets, filaments and various coating and impregnating compositions which readily may be formed from or applied as aqueous solutions to provide a grease-impermeable, water-insoluble and non-toxic product which is resistant to penetration by water.

The novel products of the invention have excellent value as permanent sizing materials for textile fabrics such as cotton, linen, silk, acetate rayon, viscose rayon, nylon, wool, glass and various vinyl resins. The sizing materials are completely resistant to known dry cleaning solvents. The compositions are useful for the impregnation of gasket materials such as cork and paper to make them resistant to penetration by organic solvents and oils. When applied to fibrous organic materials such as leather and wood, they provide oil impermeability. Paper impregnated or lightly coated with the novel composition has its wet strength increased while retaining the essential properties of the untreated paper. The composition is an excellent adhesive for cloth, paper, wood and leather.

Water-soluble hydroxyl-containing polymeric products such as the polyvinyl alcohols and the water-soluble cellulose ethers possess characteristics rendering them particularly useful in the production of impregnating compositions. Such water-solubility is advantageous since it eliminates the need for expensive volatile organic solvents. Nevertheless, water-solubility may not be desirable in the finished product as, for example, where it is desired that the completed article be insoluble in water, in hydrocarbon oils and in various organic solvents. Moreover, for many purposes the completed article should not only possess flexibility but also a degree of clarity comparable with the clarity of similar products used for like purposes.

Processes already have been devised for insolubilizing polymeric hydroxyl-containing materials by mixing them with various potentially reactive resins such as the initial water-soluble grade of urea-formaldehyde resins and the like. Such mixtures then are heated to react the hydroxyl-bearing polymeric material with the water-soluble resin to produce a water-resistant complex. However, such procedure has not proven entirely satisfactory, due to the poor compatability of the initial amide-formaldehyde condensation product and the aqueous solution of the water-soluble hydroxyl-bearing polymeric material. Invariably a cloudy suspension results on mixing these materials. In the case of certain commercially available, water-soluble melamine resins, gelling of the mixture occurs almost immediately upon the addition of the water-soluble cellulose ether.

This evidence of incompatibility appears, independently of whether the initial water-soluble resin is freshly prepared or whether a commercially available water-soluble resin is used. The incompatability is manifested in the final condensation product which invariably is cloudy or opaque, obviously heterogeneous in nature, and relatively weak.

The present invention is based upon the discovery that it is possible to produce directly from a water-soluble hydroxyl-containing polymeric material, formaldehyde, and an amide, such as urea, melamine and thiourea, condensation products well adapted for the production of sheets, films, foils, filaments, and yarns, and coating and impregnating compositions which dry to a clear, transparent and homogeneous product of superior tensile strength and which, when properly cured, are insoluble in water, and resist penetration by animal, vegetable and mineral oils, water, and most organic solvents. The water-soluble cellulose ethers having more than 1.5 hydroxyl groups available for each glucose anhydride unit are useful in the process. These include water-soluble hydroxyalkyl celluloses, mixed cellulose ethers from the reaction of cellulose with ethylene oxide and propylene oxide, and water-soluble ethyl celluloses and methyl celluloses. Preferably the cellulose ethers are substantially free from carboxymethyl and carboxyethyl groups, the presence of which presents complications in the process.

According to the invention, formaldehyde and an amide such as urea (carbamide), thiourea (thiocarbamide), melamine (the triamide of cyanuric acid) and the like are dispersed in an aqueous solution of a water-soluble hydroxyl-containing polymeric material such as a water-soluble cellulose ether or a polyvinyl alcohol. The aqueous dispersion is formed by mixing between 1 part and 24 parts by weight of the cellulose ether or other polymeric hydroxyl-bearing material, and the amide and formaldehyde in amounts to provide a total weight of 5 parts of these latter two components. The proportions of formaldehyde to amide in the mixture can vary between around 0.7 part and 3 parts of formaldehyde per part of the amide, all by weight. When using urea, preferably the cellulose ether is used in amount greater than the total amount of urea and formaldehyde, particularly when a polyhydric alcohol is not used.

The resultant dispersion then is adjusted to a pH of between 7.5 and 9, preferably by the addition of a water-soluble aliphatic amine, ammonia or ammonium hydroxide, although other neutralizing agents such as the caustic alkalies and barium hydroxide may be used less advantageously. The ethanolamines are particularly useful because of their high compatibility with the product in its final dry form. The dispersion then is heated to a temperature within the range between 50° C. and 100° C. for a period generally ranging from at least 15 minutes to 1 hour or more to effect an initial condensation reaction between the components. The dispersion then is cooled to around 30° C. or less and adjusted to a pH of from 4.0 to 6.75 by the addition of a curing catalyst, preferably a mineral acid, a lower fatty acid, a halogenated lower fatty acid, or an acidic inorganic salt. Monochloroacetic acid and phosphoric acid are especially effective. Acetic and formic acids are less effective; while strong mineral acids, such as sulfuric, hydrochloric and nitric acids, and acid salts of a relatively strong acid with a weak base such as ammonium chloride also may be used less advantageously. When using monochloroacetic acid the pH preferably is adjusted to between 6.0 and 6.75; while when using phosphoric acid the pH preferably is adjusted to between 4.0 and 4.75.

Monochloroacetic acid is the preferred curing catalyst. In order to cure a cellulose ether-amide-aldehyde reaction product of the invention by means of phosphoric acid as quickly and as completely as monochloroacetic acid cures such product at a pH of 6.5, it is necessary to increase the acidity of the phosphoric acid catalyzed product to a pH of 4.5. Moreover, the shelf life of uncured solutions containing monochloroacetic acid and adjusted to a pH of 6.5 is a matter of weeks in most cases, whereas it is a matter of about eight to twenty-four hours in the case of solutions containing phosphoric acid and adjusted to a pH of 4.5. Thus, the storage and shipment of uncured solutions already containing the curing catalyst are practicable when monochloroacetic acid is used.

The slightly acid dispersion then is converted to the form of a film or other shaped article, or it is applied to the surface of an article to be coated or impregnated therewith. The article then is dried to evaporate moisture, after which it is subjected to a heat treatment generally at temperatures between around 90° C. and 105° C., for a period of from 2 to 4 hours, or at temperatures between 150° C. and 200° C. for from 1 to 15 minutes, to facilitate curing and insolubilizing the composition.

According to an important modification of the invention, the dispersion of the water-soluble hydroxyalkyl cellulose or other hydroxyl-containing polymeric material, formaldehyde and amide, prior to being subjected to the initial condensation while at a pH of around 7.5 to 9.0, has incorporated therein a water-soluble polyhydric alcohol or a corresponding alcohol-ether in an amount ranging from a few per cent up to three hundred per cent of the weight of the said polymeric material. Suitable polyhydric alcohols include the glycols such as the ethylene, propylene and butylene glycols, and the higher 1,2 and 1,3 alkylene glycols, such as 2-ethyl hexanediol-1,3, the latter having a limited water solubility of about 4 parts in 100 parts of water at 20° C., the polyglycols such as triethylene glycol and the polypropylene glycols; and glycerol. The term "water-soluble polyhydric alcohol" is used in the claims to cover such polyhydric alcohols. The presence in the original mixture of reactants of a polyhydric alcohol provides a final product of increased flexibility and a somewhat increased tendency to swell in water.

The following examples serve to illustrate the invention. In the examples all parts are given by weight, unless otherwise specified.

*Example I*

To 89.6 parts of distilled water were added 10.4 parts of a solid finely-divided water-soluble hydroxyethyl cellulose, 4 parts of urea and 10.8 parts of a 37% aqueous formaldehyde solution. Sufficient triethanolamine was added to this homogeneous dispersion to give the latter a pH of 8.0. This dispersion, upon heating on a water bath at reflux temperature for 1 hour, and then cooling to 20° C.–30° C., yielded a completely clear homogeneous solution. The latter was adjusted to a pH of 6.5 with a 30% aqueous solution of monochloroacetic acid. A film cast on a glass plate had good clarity after being heated at 90° C.–105° C. for a half-hour. Upon curing for 5 minutes at 171° C., a water-clear and water-insoluble film resulted, which adhered tenaciously to the glass and possessed an abrasion-resistant surface.

The hydroxyethyl cellulose used in this example contained 3.5% moisture. A 5% aqueous solution thereof had a viscosity at 20° C. of 68.7 centipoises, and a pH of 6.5.

Under the conditions described in this example, but using, respectively, 5.4, 16.2 and 32.4 grams of a 37% formaldehyde solution in place of the 10.8 grams thereof used therein clear solutions were secured which were in each case stable for substantial periods of time against the development of cloudiness. Each of these solutions could be cast in the form of clear films which, upon curing for 5 minutes at 171° C., yielded water-insoluble films which varied directly in water absorption and abrasion-resistance with the amount of formaldehyde employed in the initial condensation reaction. Proportions of from 1 to 3 parts of formaldehyde per part of urea have proved useful in the process.

*Example II*

This example illustrates the type of product made when using in the process a total weight of urea and formaldehyde in excess of the weight of the cellulose ether.

10 parts of powdered water-soluble hydroxyethyl cellulose having about 3.5% moisture (a 5% solution of which had a viscosity of 68.7 centipoises at 20° C.), were dissolved at room temperature in 70 parts of a 37% aqueous solution of formaldehyde and 30 parts of distilled water. The pH of the mixture then was adjusted to 8.0 by addition of triethanolamine and 26 parts of urea were dissolved therein. The mixture then was heated with agitation at 90° C.–100° C. for 1 hour. It then was cooled, and adjusted to a pH of 6.5 by means of monochloroacetic acid. A stable solution was obtained which was convertible to a clear film by drying on a glass plate at 100° C.–105° C. for 30 minutes. On curing the film at 171° C. for 5 minutes a clear, water-insoluble highly abrasion-resistant film was obtained. Still better results are secured by employing an amount of the cellulose ether at least equal to the combined weights of urea and formaldehyde.

*Example III*

To 100 parts of an aqueous solution of a water-soluble hydroxyethyl cellulose ether having 9.87% total solids (a 5% solution of which ether had a viscosity of 76.8 centipoises at 20° C.) were added 10 parts of glycerine, 6.8 parts of urea, and 18.4 parts of a 37% aqueous solution of formaldehyde. The resultant solution had a pH of 5.92. Triethanolamine was added at room temperature until the mixture had a pH of 8.0. The temperature then gradually was raised to 90° C. with agitation, the water vapor formed being condensed and returned. After continuing the heating at 90° C.–100° C. for 1 hour, the mixture was cooled to 20° C.–30° C., and an aqueous solution of 8.5% phosphoric acid was slowly added with agitation until a pH of 4.6 was obtained. Samples of cup stock paper were coated with this clear solution. The coating was dried at 90° C.–100° C. for 10 minutes, while the paper was under tension. The tension then was released and the paper was heated for 2 hours at 90° C.–105° C. It then was kept at a temperature of 50° C.–60° C. for 15 hours longer. The resultant paper had coatings of from 8 to 10 pounds of the composition per 1,000 square feet of surface. The paper was impermeable to oil by the Tappi Standard Test, both flat and folded. Paper thus coated was still impermeable to hydrocarbon oil after steeping the paper in water for 96 hours at 25° C. and then drying at 80° C., both in the Tappi flat and the Tappi fold test.

Using another solution prepared in accordance with this example, machine glazed kraft paper of 30 pounds basic weight was impregnated with various concentrations of the said solution and cured by heat in the manner indicated herein. Important increases in the wet strength of the paper were secured, as shown in the following table:

| Amount of Composition on the paper, based upon weight of the original paper | Wet Strength of Paper after steeping 24 hours in Water (expressed as a percentage of the original dry strength) |
| --- | --- |
|  | Per cent |
| 0.0% (original paper) | 8.45 |
| 1.34% | 12.67 |
| 8.04% | 54.2 |
| 16.15% | 80.9 |

The other physical and mechanical characteristics of the paper were virtually unaffected by the treatment; and the flexibility and tear strength were well preserved.

A solution prepared in accordance with Example III was used in sizing fabrics of cotton, linen, wool, silk, viscose rayon, acetate rayon, nylon, glass and vinyl resin made by the copolymerization of vinyl chloride and vinyl acetate. The curing was accomplished by heating in accordance with Example III. Textile products of excellent hand and flexibility were thus obtained.

*Example IV*

The run of Example III was repeated with the exception that ammonium hydroxide was substituted for the triethanolamine, and the solution was heated for 1 hour at 98° C. After cooling to room temperature monochloroacetic acid was added to give the solution a pH of 6.5. The resultant clear solution was quite stable and yielded clear, water-insoluble films which, upon heating for 5 minutes at 171° C., were strong, abrasion-resistant and water-resistant.

*Example V*

Using the procedure described in Example III, a solution was prepared by mixing 100 parts of a 23% aqueous solution of a water-soluble hydroxyethyl cellulose (a 5% solution of which had a viscosity at 20° C. of 14.2 centipoises), 6.95 parts of a polypropylene glycol having an average molecular weight of 150, 4.61 parts of urea, and 12.41 parts of a 37% aqueous solution of formaldehyde. After adjusting the pH to 8.0 with triethanolamine, and conducting the initial condensation by heating the solution for 1 hour at 90° C.–100° C., the solution was cooled to room temperature and the pH adjusted to 4.4, using an 8.5% solution of phosphoric acid. The resultant solution was used successfully as an adhesive in a convolutely wound paper sheet used in the manufacture of shotgun shells. It also gave excellent results as a permanent size for cottonprint cloth.

*Example VI*

To 750 parts of a 23% aqueous solution of the water-soluble hydroxyethyl cellulose used in Example V were added 52 parts of 2-ethyl hexanediol-1,3, 34.6 parts of urea and 93.4 parts of a 37% aqueous formaldehyde solution. The resultant solution was adjusted to a pH of 8.0 and was heated for about 1 hour at a temperature of 90° C.–100° C. to effect the initial degree of condensation. It then was cooled to around 20° C.–30° C. and the pH adjusted to 4.5 with a solution of phosphoric acid. The resultant solution formed an excellent adhesive in the production of convolutely wound paper tubes used in making shotgun shells. Films and coatings thereof, when dried and cured by heating at 105° C. for 2 hours, and at 50° C.–60° C. for 15 hours had unusually good moisture resistance and good flexibility.

*Example VII*

To 50 parts of a 10% solution of the water-soluble hydroxyethyl cellulose described in Example III were added 5 parts of propylene glycol, 2.1 parts of thiourea and 4.55 parts of a 37% aqueous solution of formaldehyde. This solution was adjusted to a pH of 8.0 with ammonium hydroxide, and then heated at 85 C. for 1 hour. The solution then was cooled to 20° C.–30° C. and adjusted to a pH of 6.5 by adding monochloroacetic acid. Films cast from the resultant solution were heat-cured at 149° C. for 5 minutes. Both the solution and films were clear, homogeneous and water-insoluble.

In a similar run in which the solution was adjusted to a pH of 8.0 by means of triethanolamine before the initial condensation step, and the pH of the solution from the initial condensation was adjusted to a pH of 4.5 by means of phosphoric acid, generally similarly results were secured. Bristol board was coated with the resultant solution, dried and heated at 90° C.–105° C. for 2 hours, and then at 50° C.–65° C. for 10 hours. The coating, on rehumidification at a relative humidity of 44%, was flexible, clear, lustrous and insoluble in water. It was oil-impermeable by the standard Tappi test.

Example VIII

To 100 parts of a 5% solution of water-soluble methyl cellulose (a 2% aqueous solution of which had a viscosity at 20° C. of 100 centipoises), were added 5 parts of glycerol, 4.15 parts of urea and 12 parts of a 37% aqueous formaldehyde solution. The pH was adjusted to 8.1 by triethanolamine, and the solution was heated for 1 hour at 80° C.–90° C. It then was cooled to 20° C.–30° C. and the pH adjusted to 4.6 by means of a solution of phosphoric acid. A clear homogeneous solution was obtained which was stable for several hours, after which it gradually increased in viscosity and converted to a clear gel.

Soon after adding the phosphoric acid a quantity of cup paper stock was coated with the solution and the coated paper heated at 90 C.–105° C. for 2 hours, and then at 50° C.–65° C. for 10 hours. The cured coating was water-insoluble, oil-impermeable and very flexible.

Generally similar products were made by substituting ammonium hydroxide for the triethanolamine to provide a pH of 8.0; and by substituting monochloroacetic acid for the phosphoric acid to provide a pH of 6.5.

Example IX

To 50 parts of a 9.8% solution of the water-soluble hydroxyethyl cellulose described in Example III were added 5 parts of glycerol, 2.5 parts of melamine, 4.9 parts of a 37% aqueous formaldehyde solution, and enough triethanolamine to adjust the pH of the solution to 8.0. After heating it for 1 hour at 80° C.–90° C. a clear solution was obtained that on cooling to 20° C.–30° C. was completely stable. The pH of this solution was adjusted to 4.88 by means of an 8.5% solution of phosphoric acid, after which the solution was stable for 8 hours. A coating of this solution was applied to bristol board, dried and heated for 2 hours at 90° C.–105° C., and then for 2 hours at 50° C.–60° C. The coating was glassy clear, completely insoluble in water, fairly flexible, and completely impermeable to turpentine in the standard Tappi test.

Example X

To 100 parts of an 8% aqueous solution of a polyvinyl alcohol were added 8.5 parts of glycerol, 5.44 parts of urea, 15.3 parts of a 37% aqueous formaldehyde solution, and 3 drops of ammonium hydroxide, and the mixture was stirred at 98° C. for 1 hour at a pH of 8.2. It was cooled, adjusted to a pH of 6.5 with monochloroacetic acid, and a film was cast which was heat-cured at 149° C. for 5 minutes. Both the solution and the film were completely clear and homogeneous.

In a similar run wherein triethanolamine was substituted for the ammonium hydroxide, and the final adjustment of the pH was made with a phosphoric acid solution, the resultant clear solution was stable for several days. A coating of the solution on cup paper stock, after curing 2 hours at 90° C.–105° C. and then 2 hours at 50° C.–65° C., was flexible, and was impermeable to water and oils.

A mixture of this polyvinyl alcohol solution with a solution of either a water-soluble urea-formaldehyde resin or with a dilute hydrochloric acid solution of a melamine resin, both being marketed commercially, resulted in an immediate precipitation of resin, indicating the incompatibility of these ingredients in solution.

Similar runs were made following the foregoing examples but wherein a preformed water-soluble amide-formaldehyde resin replaced the amide and formaldehyde in the initial condensation, the resin being present with the water-soluble hydroxyethyl cellulose in the same proportions as the amide and formaldehyde of the examples. In other words, the hereindescribed examples were followed with the exception that a previously prepared water-soluble amide-formaldehyde resin was added to the cellulose ether, either with or without the addition of a polyhydric alcohol, and the resultant solution was treated in the general manner described in the examples. In each case the resin precipitated within the liquid, producing a thick, cloudy or white heterogeneous mixture, whereas a completely homogeneous clear solution results when the initial condensation occurs between the cellulosic ether, amide and formaldehyde, with or without a polyhydric alcohol being present. The incompatibility of the cellulose ether and the water-soluble amide-formaldehyde resin was obvious at once, for resin precipitated immediately. Various commercial urea-formaldehyde water-soluble resins gave similar results. The heterogeneous liquid upon curing yielded cloudy films of objectionable appearances.

I claim:

1. Process for preparing a substantially water-insoluble, oil-impermeable product from a water-soluble cellulose ether, which comprises preparing an aqueous solution of (1) a water-soluble hydroxyl-containing cellulose ether, (2) an amide selected from the group consisting of carbamide, thiocarbamide and the triamide of cyanuric acid, and (3) formaldehyde, in the proportion of between 1 part and 24 parts of the cellulose ether to a total of around 5 parts of said amide and formaldehyde, the ratio of formaldehyde to said amide being within the range between 0.7 part and 3 parts of formaldehyde to 1 part of said amide, all parts by weight, adjusting the pH of the resultant solution to between 7.5 and 9.0, heating the solution within the range between 50° C. and 100° C. for from fifteen minutes to one hour, thereafter cooling it to a temperature of 20°–30° C., adjusting the pH of the solution to between 4.0 and 6.75, drying the solution to remove water, and heating the dry product at between 90° C. and 200° C. for a period sufficient to render it substantially insoluble in water.

2. Process for preparing a clear, tough, substantially water-insoluble, water-impermeable product, which comprises preparing an aqueous solution of (1) a water-soluble hydroxyl-containing cellulose ether, (2) an amide selected from the class consisting of carbamide, thiocarbamide and the triamide of cyanuric acid, (3) formaldehyde and (4) a water-soluble polyhydric alcohol, in the proportion of between 1 and 24 parts of the cellulose ether to a total of around 5 parts of said amide and formaldehyde, and between a few per cent and 300 per cent of said alcohol, based upon the weight of the cellulose ether, the ratio of formaldehyde to said amide being within the range between 0.7 part and 3 parts of formaldehyde to 1 part of said amide, all parts by weight, adjusting the pH of the resultant solution to between 7.5 and 9.0, heating the solution within the range between 50° C. and 100° C. for from fifteen minutes to one hour, thereafter cooling it to a temperature of 20°–30° C., adjusting the pH of the solution to between 4.0 and 6.75, drying the solution to remove water, and heating the dry product at between 90° C. and 200° C. for a period sufficient to render it substantially insoluble in water.

3. Process for preparing a substantially water-insoluble, oil-impermeable product from a water-soluble cellulose ether, which comprises preparing an aqueous solution of (1) a water-soluble hydroxyl-containing cellulose ether, (2) urea and (3) formaldehyde, in the proportion of between 1 part and 24 parts of the cellulose ether to a total of around 5 parts of urea and formaldehyde, the ratio of formaldehyde to urea being within the range between 1 and 3 parts of formaldehyde to 1 part of urea, all parts by weight, adjusting the pH of the resultant solution to between 7.5 and 9.0, heating the resultant solution within the range between 50° C. and 100° C. for from fifteen minutes to one hour, thereafter cooling it to a temperature of 20°–30° C., adjusting the pH of the solution to between 4.0 and 6.75, drying the solution to remove water, and heating the dry product at between 90° C. and 200° C. for a period sufficient to render it substantially insoluble in water.

4. Process for preparing a substantially water-insoluble, oil-impermeable product from a water-soluble cellulose ether, which comprises preparing an aqueous solution of (1) a water-soluble cellulose ether substantially free from carboxyalkyl groups, (2) urea and (3) formaldehyde, in the proportion of between 1 part and 24 parts of the cellulose ether to a total of around 5 parts of urea and formaldehyde, the ratio of formaldehyde to urea being within the range between 1 and 3 parts of formaldehyde to 1 part of urea, all parts by weight, adjusting the pH of the resultant solution to between 7.5 and 9.0, heating the resultant solution within the range between 50° C. and 100° C. for from fifteen minutes to one hour, thereafter cooling it to a temperature of 20°–30° C., adjusting the pH of the solution to between 4.0 and 6.75, drying the solution to remove water, and heating the dry product for a period of from one minute to four hours at a temperature within the range between 90° C. and 200° C., the period of exposure to said temperature varying inversely with the temperature.

5. Process for preparing from the water-soluble cellulose ether a product convertible upon heating into a substantially water-insoluble, water-impermeable state, which comprises preparing an aqueous solution of (1) a water-soluble cellulose ether substantially free from carboxylalkyl groups (2) an amide selected from the group consisting of carbamide, thiocarbamide and the triamide of cyanuric acid, and (3) formaldehyde, in the proportion of between 1 part and 24 parts of the cellulose ether to a total of around 5 parts of said amide and formaldehyde, the ratio of formaldehyde to said amide being within the range between 0.7 part and 3 parts of formaldehyde to 1 part of said amide, all parts by weight, adjusting the pH of the resultant solution to between 7.5 and 9.0, heating the solution within the range between 50° C. and 100° C. for from fifteen minutes to one hour and, after cooling the solution to a temperature of 20°–30° C., adjusting the pH of the solution to around 6.5 by means of monochloroacetic acid, thereby providing a homogeneous aqueous solution containing a curing catalyst and which is stable for several weeks at temperatures around room temperature but is convertible to a substantially water-insoluble, oil-impermeable product upon heating to a temperature of between 90° and 200° C.

6. Process for preparing a substantially water-insoluble, oil-impermeable product from a water-soluble, hydroxyl-containing polymeric material, which comprises preparing an aqueous solution of (1) a water-soluble polymeric material selected from the group consisting of the cellulose ethers substantially free from carboxyalkyl groups and the polyvinyl alcohols, (2) an amide selected from the group consisting of carbamide, thiocarbamide, and the triamide of cyanuric acid, and (3) formaldehyde in the proportion of between 1 part and 24 parts of the said polymeric material to a total of around 5 parts of said amide and formaldehyde, the ratio of formaldehyde to said amide being within the range between 0.7 parts and 3 parts of formaldehyde to 1 part of said amide, all parts by weight, adjusting the pH of the resultant solution to between 7.5 and 9.0, heating the solution within the range between 50° C. and 100° C. for from fifteen minutes to one hour, thereafter cooling it to a temperature of 20°–30° C., adjusting the pH of the solution to between 4.0 and 6.75, drying the solution to remove water, and heating the dry product at between 90° C. and 200° C. for a period sufficient to render it substantially insoluble in water.

7. Process for preparing a substantially water-insoluble, oil-impermeable product from a water-soluble cellulose ether, which comprises preparing an aqueous solution of (1) a water-soluble cellulose ether, substantially free from carboxyalkyl groups (2) an amide selected from the group consisting of carbamide, thiocarbamide and the triamide of cyanuric acid, and (3) formaldehyde, in the proportion of between 1 part and 24 parts of the cellulose ether to a total of around 5 parts of said amide and formaldehyde, the ratio of formaldehyde to said amide being within the range between 0.7 part and 3 parts of formaldehyde to 1 part of said amide, all parts by weight, adjusting the pH of the resultant solution to between 7.5 and 9.0 by the addition of a water-soluble alkaline compound, heating the solution within the range between 50° C. and 100° C. for from fifteen minutes to one hour, thereafter cooling it to a temperature of 20°–30° C., adjusting the pH of the solution to between 6 and 6.75 by the addition of monochloracetic acid, drying the solution to remove water, and heating the dry product at between 90° C. and 200° C. for a period sufficient to render it substantially insoluble in water.

8. Process for preparing from a water-soluble cellulose ether a product convertible upon heating into a substantially water-insoluble, oil-impermeable state, which comprises preparing an aqueous solution of (1) a water-soluble cellulose ether, substantially free from carboxyalkyl groups (2) an amide selected from the group consisting of carbamide, thiocarbamide and the triamide of cyanuric acid, (3) formaldehyde, and (4) up to 300% of a water-soluble polyhydric alcohol, based upon the weight of the cellulose ether, in the proportion of between 1 part and 24 parts of the cellulose ether to a total of around 5 parts of said amide and formaldehyde, the ratio of formaldehyde to said amide being within the range between 0.7 part and 3 parts of formaldehyde to 1 part of said amide, all parts being by weight, adjusting the pH of the resultant solution to between 7.5 and 9.0, heating the solution within the range between 50° C. and 100° C. for from 15 minutes to 1 hour and, after cooling the solution to a temperature of 20° C.–30° C., adjusting the pH of the solution to around 6.5, thereby providing a homogeneous aqueous solution containing a curing catalyst and which is convertible to a substantially water-insoluble, oil-impermeable product upon heating to a temperature of between 90° C. and 200° C.

AUBREY E. BRODERICK.

REFERENCES CITED

The following references are of record in the file of this patent:

UNITED STATES PATENTS

| Number | Name | Date |
|---|---|---|
| 2,237,240 | Sponsel | Apr. 1, 1941 |

FOREIGN PATENTS

| Number | Country | Date |
|---|---|---|
| 361,910 | Great Britain | Nov. 16, 1931 |